United States Patent [19]
Koyanagi

[11] Patent Number: 5,884,217
[45] Date of Patent: *Mar. 16, 1999

[54] MAP DISPLAY APPARATUS FOR MOTOR VEHICLE

[75] Inventor: Takuo Koyanagi, Zama, Japan

[73] Assignee: Xanavi Informatics Corporation, Kanagwa, Japan

[*] Notice: The term of this patent shall not extend beyond the expiration date of Pat. No. 5,862,498.

[21] Appl. No.: 678,766

[22] Filed: Jul. 11, 1996

Related U.S. Application Data

[63] Continuation of PCT/JP95/02308, Nov. 13, 1995.

[30] Foreign Application Priority Data

| Nov. 14, 1994 | [JP] | Japan | 6-278910 |
| Dec. 12, 1994 | [JP] | Japan | 6-307594 |
| Dec. 12, 1994 | [JP] | Japan | 6-307595 |
| Dec. 12, 1994 | [JP] | Japan | 6-307596 |

[51] Int. Cl.$^6$ .................................................. G06G 7/78
[52] U.S. Cl. .................. 701/208; 701/212; 701/211; 340/995; 340/990; 340/988; 73/178 R
[58] Field of Search .................. 701/200, 206, 701/207, 208, 209, 210, 211, 212, 213, 214, 25; 340/988, 990, 995; 73/178 R

[56] References Cited

U.S. PATENT DOCUMENTS

| 4,504,913 | 3/1985 | Miura et al. | 701/212 |
| 4,963,864 | 10/1990 | Iihoshi et al. | 701/208 |
| 5,161,886 | 11/1992 | De Jong et al. | 701/208 |
| 5,197,009 | 3/1993 | Hoffman, Jr. et al. | 701/200 |
| 5,266,948 | 11/1993 | Matsumoto | 701/208 |
| 5,414,629 | 5/1995 | Inoue | 701/210 |
| 5,450,343 | 9/1995 | Yurimoto et al. | 701/208 |
| 5,742,924 | 4/1998 | Nakayama | 701/208 |
| 5,748,109 | 5/1998 | Kosaka et al. | 340/995 |
| 5,793,310 | 8/1998 | Watanabe et al. | 340/995 |

FOREIGN PATENT DOCUMENTS

| 1-263688 | 10/1989 | Japan . |
| 2-090191 | 3/1990 | Japan . |
| 2-267583 | 11/1990 | Japan . |
| 3-026917 | 2/1991 | Japan . |
| 3-225391 | 10/1991 | Japan . |

*Primary Examiner*—Jacques H. Louis-Jacques
*Attorney, Agent, or Firm*—Evenson, McKeown, Edwards & Lenahan, P.L.L.C.

[57] ABSTRACT

A map display apparatus according to the present invention has a display device capable of displaying a road map in different map forms in a base screen region and a window screen region. A control circuit determines whether the window screen is provided or not on the basis of input information entered through an input device, and determines which one of a planimetric map and a bird's-eye view is displayed in the base screen and the window screen. Either of the planimetric map and the bird's-eye view are displayed using road map data as a common map data base stored in a map storage memory, which eventually reduces the cost of the apparatus. When the window screen is displayed, a range of the road map including at least a range of the road map displayed in the base screen is displayed in the window screen, and an indication representing the range of the road map displayed in the base screen is displayed in the window screen.

12 Claims, 21 Drawing Sheets

FIG. 12

| MESH NUMBER |
| --- |
| NUMBER n OF GUIDANCE POINTS IN MESH |
| X-COORDINATE OF GUIDANCE POINT 1 |
| Y-COORDINATE OF GUIDANCE POINT 1 |
| DESIGNATION FLAG OF GUIDANCE POINT 1 |
| . |
| . |
| . |
| . |
| X-COORDINATE OF GUIDANCE POINT n |
| Y-COORDINATE OF GUIDANCE POINT n |
| DESIGNATION FLAG OF GUIDANCE POINT n |

D(X-40, Y+60)   C(X+40, Y+60)

M(X, Y)

A(X-10, Y-20)   B(X+10, Y-20)

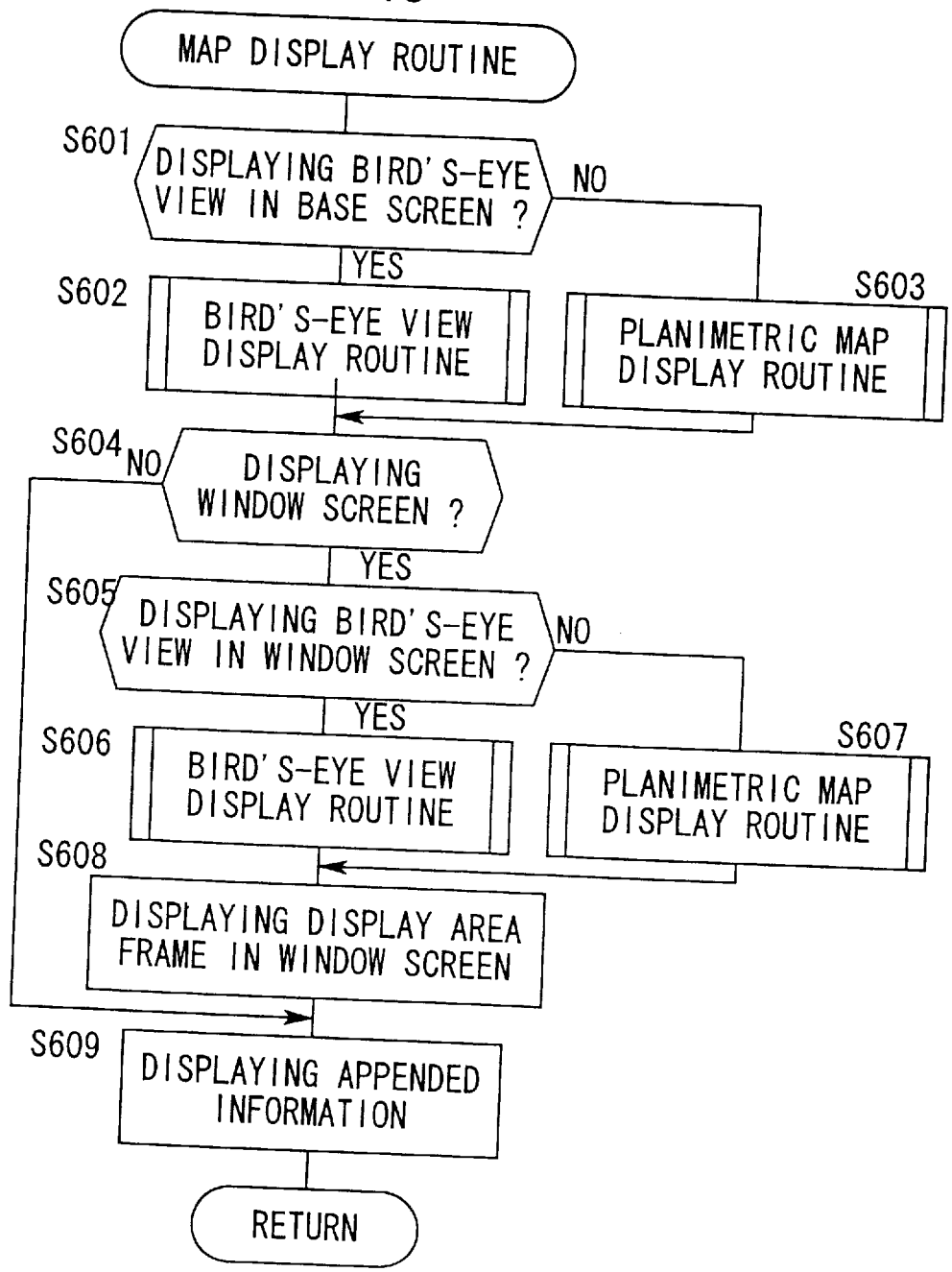

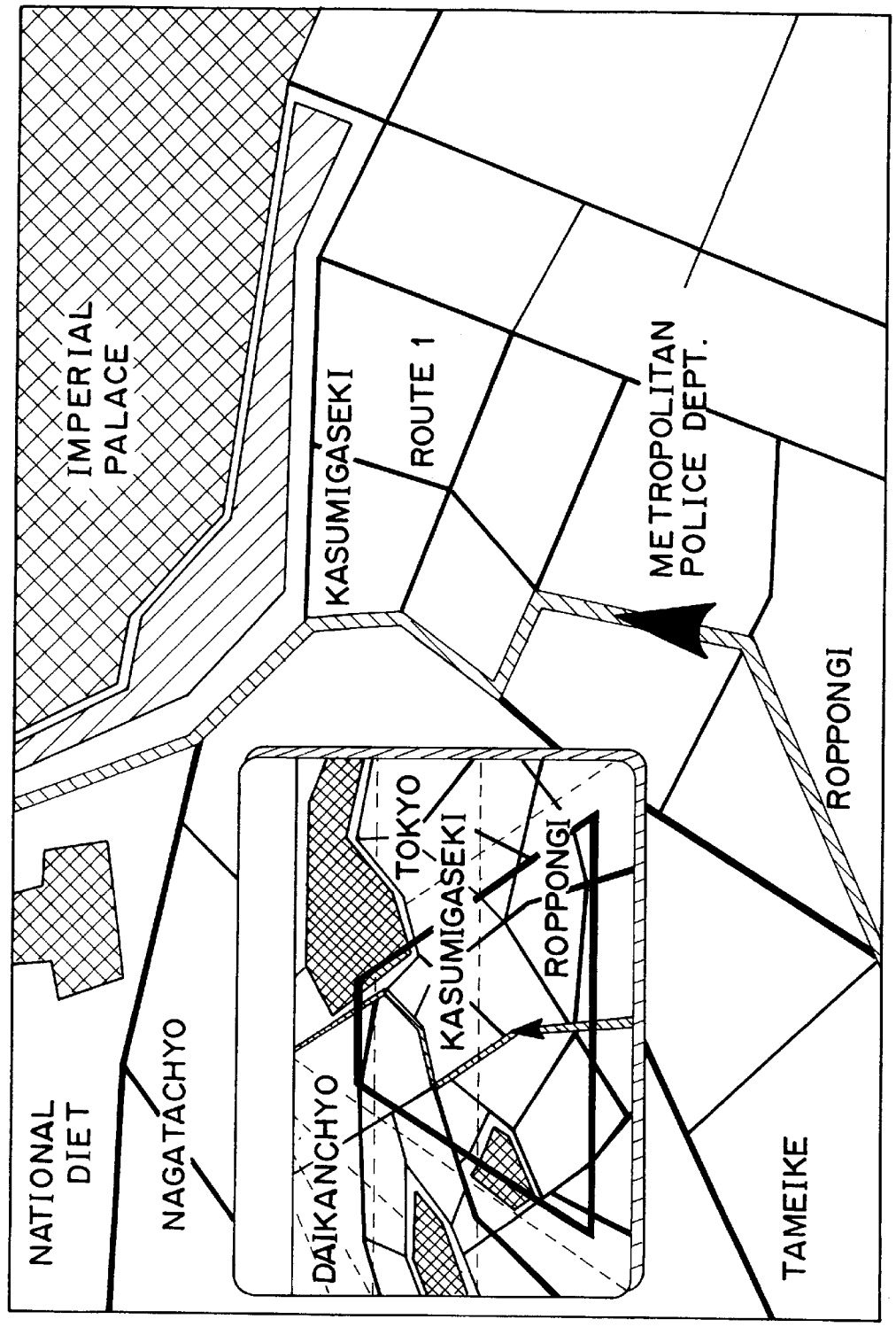

MAP DISPLAY APPARATUS FOR MOTOR VEHICLE

This application is a continuation of PCT Application No. PCT/JP95/02308 filed on Nov. 13, 1995.

FIELD OF THE ART

The present invention relates to a map display apparatus for a motor vehicle, which is capable of displaying a road map in the vicinity of a vehicle position on a display device.

BACKGROUND ART

There is known a map display apparatus for a motor vehicle, which displays a road map in the form of a so-called bird's-eye view, namely, displays the road map on a display device such that the road map around the current position of the vehicle (vehicle position) is displayed in a larger scale than a far side view (refer to laid-open Publication No. 2-244188 of unexamined Japanese Patent Application, for example). The apparatus disclosed in the above-identified publication places a view point behind the current position of the vehicle, and displays a view taken by looking down the map from this view point in the travelling direction of the vehicle, on a screen of the display device. In this manner of displaying the bird's-eye view, it is possible to display map information around the current position in a larger scale, and also display a wide range of map information ranging from the current position to a distance place. This makes it easier to visually grasp connecting conditions of junctions of roads. Further, the road map can be displayed with an increased sense of reality as if the driver himself/herself actually looked down the road map.

When the road map is displayed in the form of the bird's-eye view, however, the map scale is continuously varied from the lower edge of the screen toward the upper edge, making it difficult for the driver to grasp a sense of distance. When the driver is not accurately aware of road conditions around the vehicle position, as in the case where the vehicle is running through an area that is unfamiliar to the driver, it is more desirable to display an ordinary planimetric map on a map scale that does not vary in local parts of the map, rather than displaying the bird's-eye view.

If the processing for displaying the road map in the form of the bird's-eye view is effected using road map data independent of road map data used for displaying a planimetric map, there arises a need to newly add the road map data for the bird's-eye view, which may increase the cost of the apparatus.

It is an object of the present invention to provide a map display apparatus for a motor vehicle, which is capable of selecting as desired the map form of the road map displayed on the display device. It is another object of the present invention to provide a map display apparatus for a motor vehicle, which is able to display road maps in a plurality of different map forms at the same time. It is a further object of the present invention to provide a map display apparatus for a motor vehicle, which is able to display road maps of different map forms, using the same map data base.

DISCLOSURE OF THE INVENTION

To accomplish the above-described objects, the present invention is applied to a map display apparatus for a motor vehicle, comprising: road map storage device which stores road map data related to a road map; and a display device capable of displaying the road map. A map display apparatus for a motor vehicle further comprises vehicle position detecting device which detects a vehicle position; bird's-eye view data converting circuit which retrieves a predetermined range of the road map data from the road map storage device and converts the road map data into bird's-eye view data, so as to display on the display device a bird's-eye view taken by looking down the road map from a view point at a predetermined looking-down angle in a predetermined looking-down direction, the view point being placed above the vicinity of the vehicle position on the road map; planimetric map data preparing circuit which prepares planimetric map data on the basis of the road map data so that a planimetric map of the vicinity of the vehicle position is displayed on the display device on a map scale that is unvaried in local parts of the planimetric map; and switching circuit which switches one of the planimetric map and said bird's-eye view to be displayed on the display device to the other. Since it is possible to select any one of the planimetric map and the bird's-eye view to be displayed on the display device, the planimetric map may be displayed when it is desired to correctly grasp a distance between two points, for example, and a bird's-eye view may be displayed when it is desired to take an extensive view from the vicinity of the vehicle position to a distant place, thus assuring increased easiness in using the map display apparatus.

In either case of displaying the planimetric map and the bird's-eye view, the road map storage device as a common map data base can be used for data processing, whereby the amount of data can be reduced and the cost and size of the apparatus may be reduced. Further, the planimetric map and the bird's-eye view can be displayed at the same time, making it possible to display a wide range of road map with an increased sense of reality, which is a characteristic of the bird's-eye view, as well as a road map that makes it easier to grasp a sense of distance, which is a characteristic of the planimetric map. In an arrangement in which a second display region is provided in a part of a first display region in a display screen of the display device, an indication representing a range of the road map displayed in the first display region may be displayed in the second display region, thereby making it easier to grasp a geographical relationship in the vicinity of the vehicle position.

BRIEF DESCRIPTION OF THE DRAWINGS

FIG. 12 is a view showing the data structure of guidance point information stored in a map storage memory.

FIG. 19 is a detailed flow chart of a map display routine of step S5 of FIG. 15.

FIG. 20 is a view showing an example in which a planimetric map is displayed in the base screen while a bird's-eye view is displayed in the window screen.

BEST MODE FOR EMBODYING THE INVENTION

First Embodiment

Figure 1:
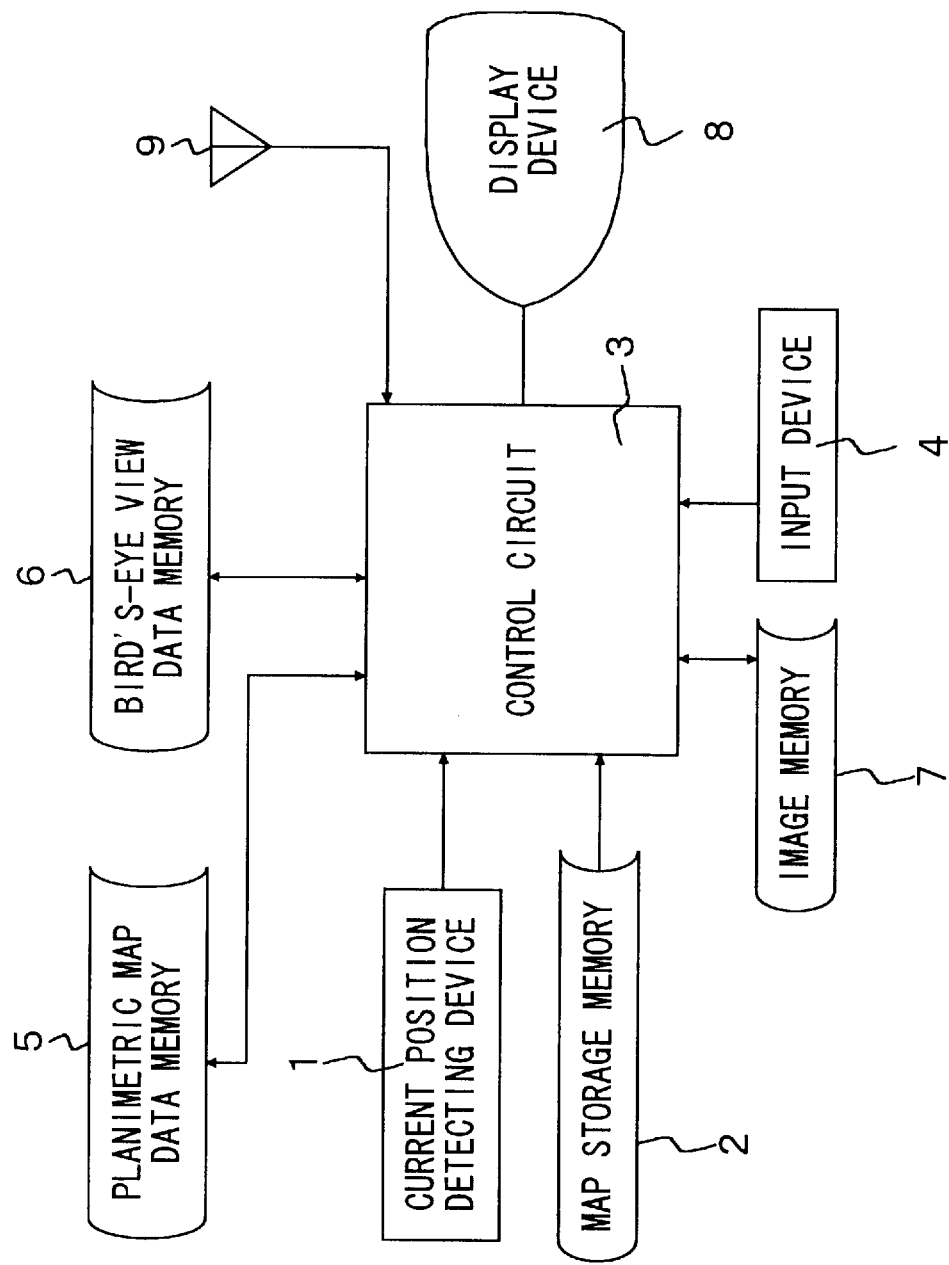
FIG. 1 is a block diagram of a map display apparatus for a motor vehicle according to the first embodiment of the present invention.

FIG. 1 is a block diagram of a map display apparatus for a motor vehicle according to the first embodiment of the present invention.

In FIG. 1, reference numeral 1 denotes a current position detecting device for detecting the current position of the vehicle, which consists of a direction sensor for detecting a travelling direction of the vehicle, a vehicle speed sensor for detecting a vehicle speed, a GPS sensor for detecting GPS signals received from a GPS (Global Positioning System) satellite, and others. Reference numeral 2 denotes a map storage memory for storing road map data, which is constituted by a mass storage medium, such as CD-ROM. The road map data stored in the map storage memory 2 consist mainly of road data, name data, background data and the like.

Reference numeral 3 denotes a control circuit for controlling the whole apparatus, which consists of a microprocessor and its peripheral circuits. Reference numeral 4 denotes an input device for entering the destination of the vehicle and others, and 5 denotes a planimetric map data memory that stores road map data used for displaying a planimetric map (road map on a constant scale) obtained by viewing a road map from right above on a display device 8. Reference numeral 6 denotes a bird's-eye view data memory that stores road map data used for displaying a bird's-eye view, and 7 denotes an image memory that stores image data representative of images to be displayed on the display device 8. The image data stored in the image memory 7 are retrieved when needed, and displayed on the display device 8. Reference numeral 9 denotes an antenna for receiving traffic information transmitted from a beacon, for example.

Figure 2:
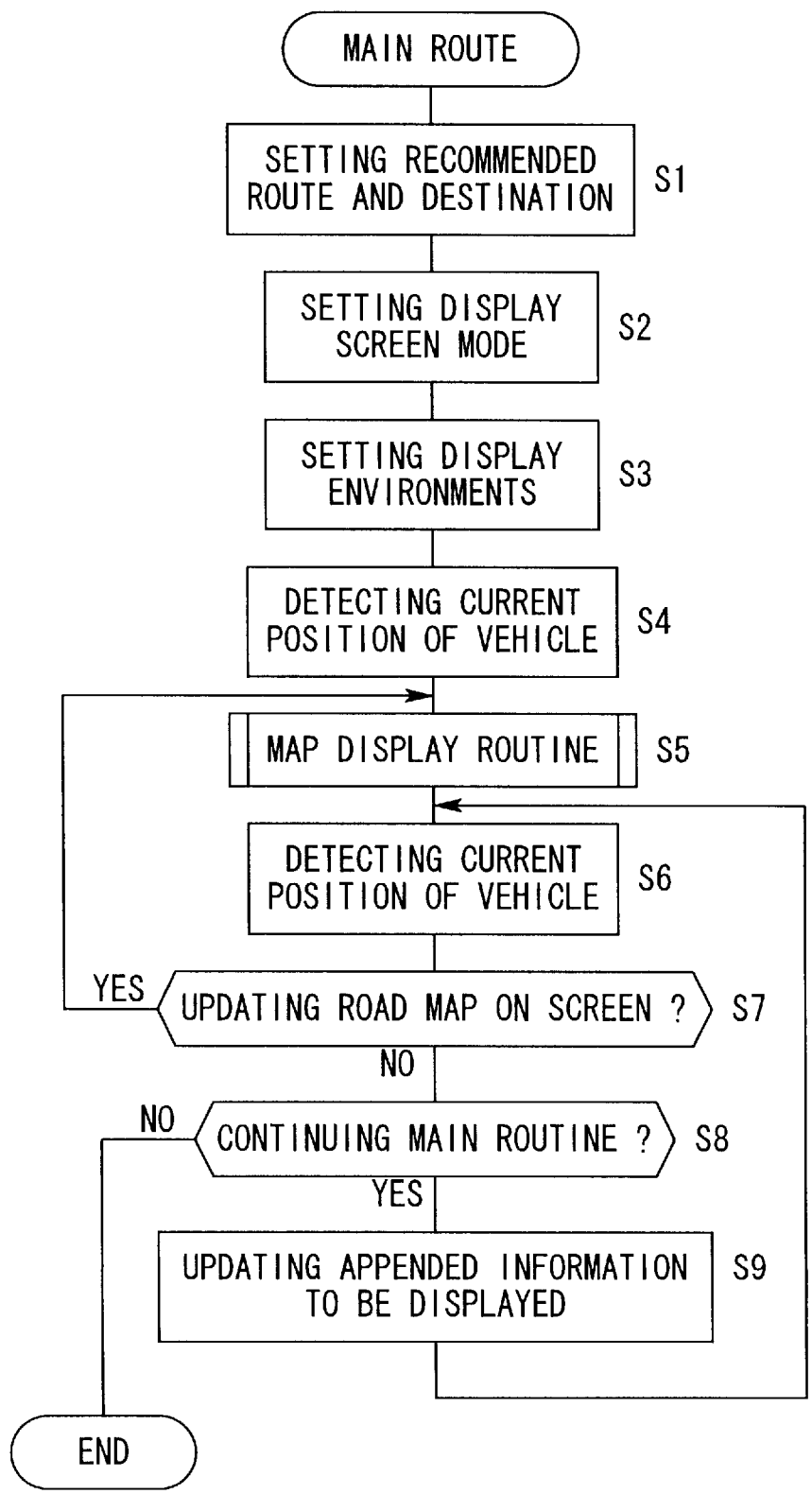
FIG. 2 is a flow chart showing a main routine implemented by a control circuit of the first embodiment.

FIG. 2 is a flow chart showing a main routine of the control circuit 3 of the first embodiment. In the following, the operation of the present embodiment will be explained referring to this flow chart. The control unit 3 initiates the routine of FIG. 2 when a key is operated to turn on an ignition switch, for example. In step S1 of FIG. 2, recommended route and destination are determined or established. Described in more detail, the destination is determined on the basis of information entered through the input device 4, and the recommended route is determined by calculating according to a known Dykstra method, for example. The recommended route may be selected from a number of proposed recommended routes that are stored in advance in ROM or the like.

In step S2, a display screen mode is established. The display screen mode may be selected from eight modes (1) through (8) as described below, for example. The operator selects one or more of these modes by means of the input device 4. In the following description, a base screen means the whole display screen of the display device 8, while a window screen means a part of the base screen in the form of a window in which certain images are to be displayed.

(1) A mode wherein the window screen is always displayed.

(2) A mode wherein the window screen is not displayed all the time.

(3) A mode wherein the window screen is automatically displayed as the vehicle approaches a given guidance point on the recommended route.

(4) A mode wherein the window screen is automatically displayed upon receiving traffic/guidance information.

(5) A mode for displaying a bird's-eye view in the base screen and a planimetric map in the window screen.

(6) A mode for displaying the bird's-eye view in the base screen and the bird's-eye view in the window screen.

(7) A mode for displaying the planimetric map in the base screen and the bird's-eye view in the window screen.

(8) A mode for displaying the planimetric map in the base screen and the planimetric map in the window screen.

Step S3 is then executed to establish display environments. The display environments set in this step may include five items as indicated below. These display environments are selected by the operator through the input device 4.

(1) Selecting the size of the window screen.

(2) Selecting scales of maps displayed in the base screen and the window screen.

(3) Selecting the display position of the window screen.

(4) Selecting display colors of the base screen and the window screen.

(5) Selecting display directions of the base screen and the window screen.

In step S4, the current position of the vehicle is detected. Step S5 is then executed to implement a map display routine as shown in detail in FIGS. 3 through 5. With this routine implemented, a road map as shown in FIG. 6 may be displayed in which a bird's-eye view is displayed in the base screen, and a planimetric map is displayed in the window screen, for example.

In step S6, the current position of the vehicle is detected in the same manner as in step S4. Step 7 is then executed to determine whether the road map on the screen should be updated or not, namely, whether the road map should be rewritten or not. In this step, it is determined to update the road map when the vehicle runs a predetermined distance or farther, or when the operator enters a command for scrolling by means of the input device 4, for example.

If an affirmative decision is obtained in step S7, the control flow returns to step S5. If a negative decision is obtained in step S7, step S8 is then implemented to determine whether the main routine of FIG. 2 is continued or not. A negative decision is obtained in step S8 when a power switch (not shown) is turned off, or when a switch is operated to cancel the routine, and the main routine of FIG. 2 is terminated.

If an affirmative decision is obtained in step S8, the control flow goes to step S9 to update appended information to be displayed, and then returns to step S6. The appended information mentioned herein may include a vehicle position mark displayed at a position corresponding to the current position of the vehicle, for example. In the above step S9, the display position of the appended information, such as the vehicle position mark, is changed according to the travel distance of the vehicle. In the case where such vehicle position marks are displayed on both the base screen and the window screen, the display positions of both of the vehicle position marks will be changed.

Figure 3:
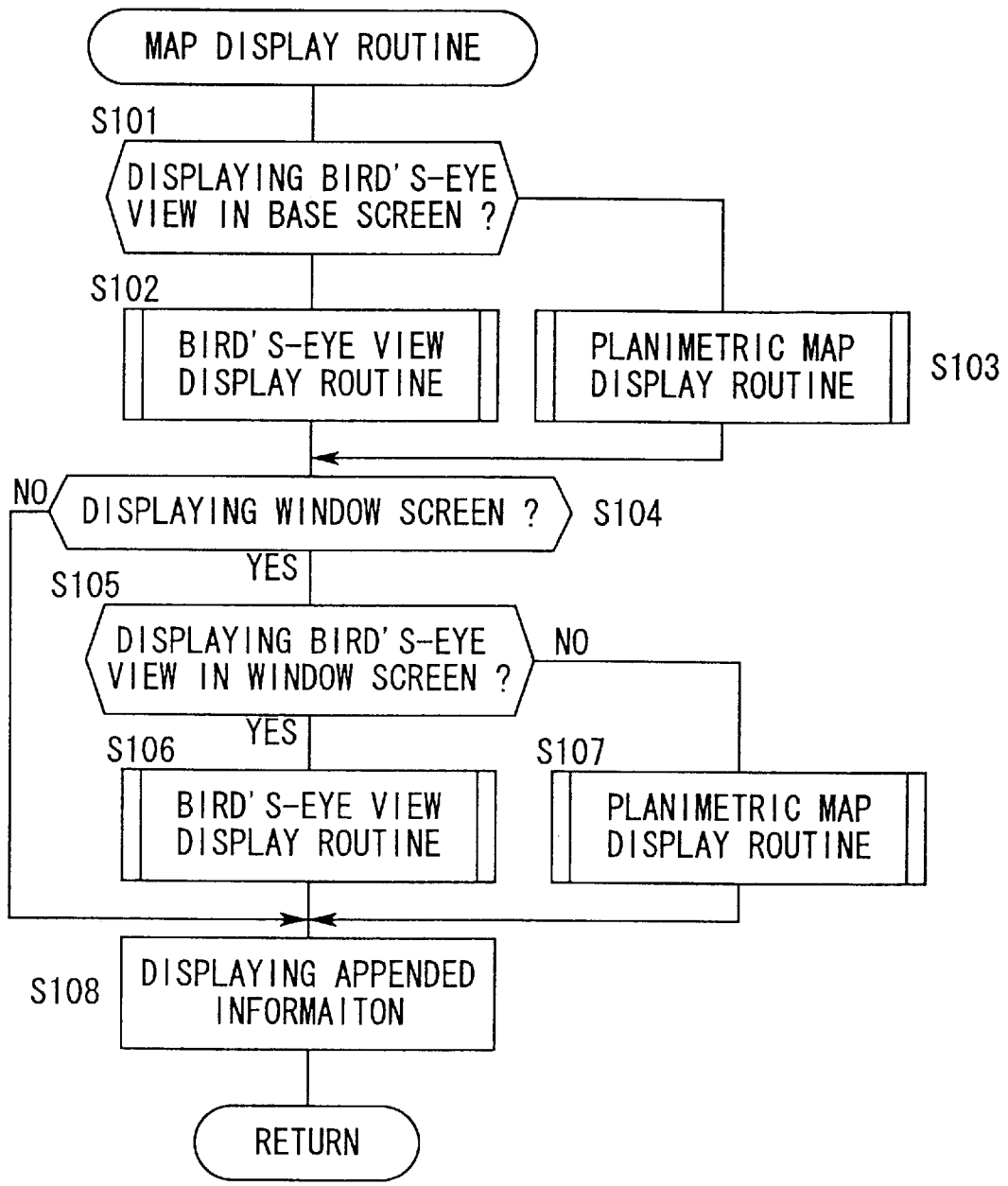
FIG. 3 is a detailed flow chart of a map display routine of step S5 of FIG. 2.
Figure 4:
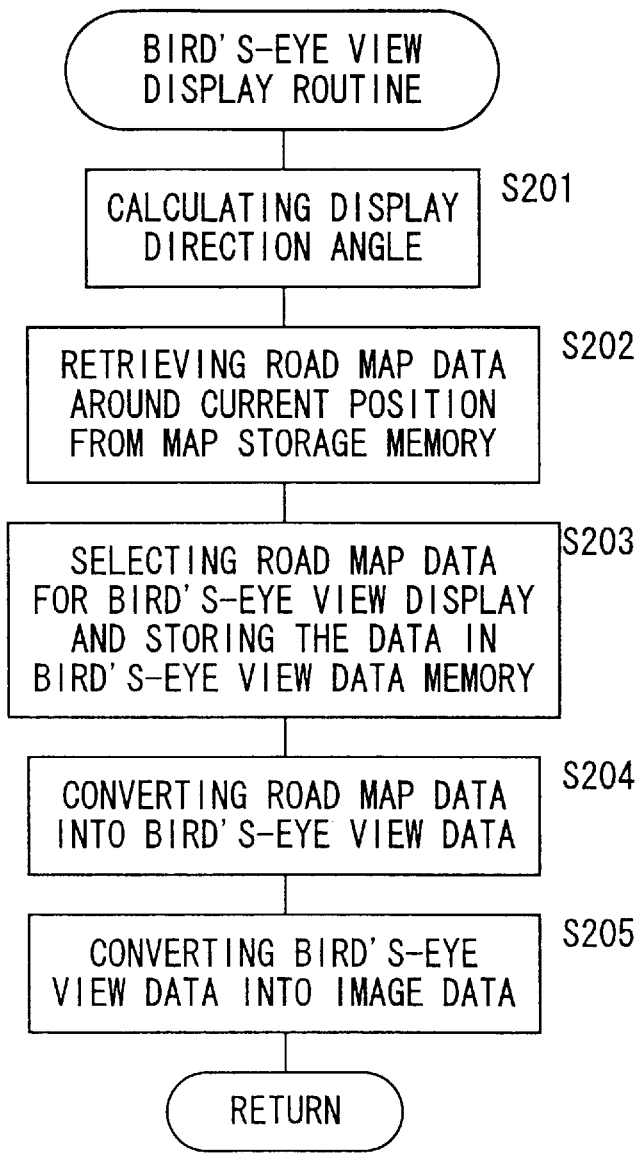
FIG. 4 is a detailed flow chart of a bird's-eye view display routine of step S102 of FIG. 3.
Figure 5:
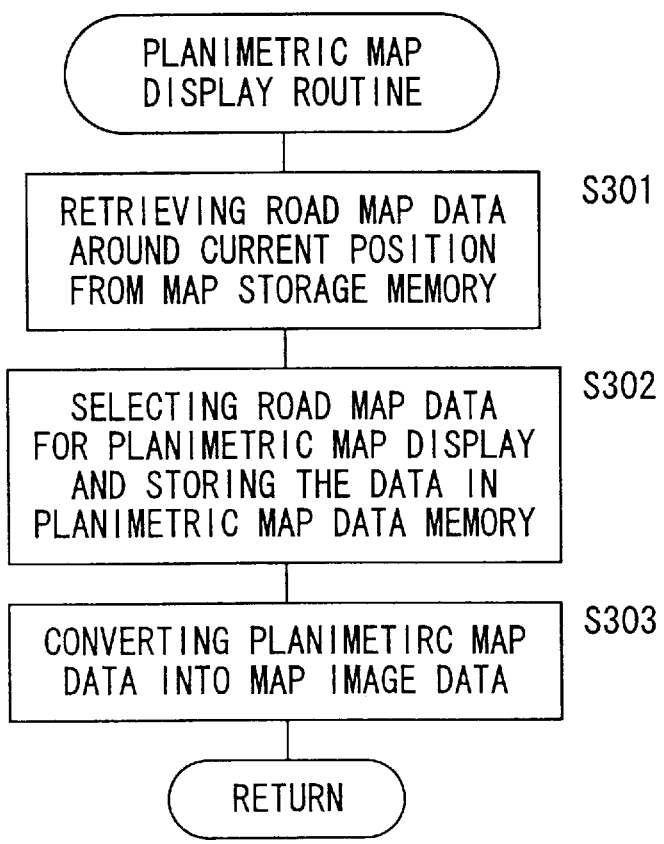
FIG. 5 is a detailed flow chart of a planimetric map display routine of step S103 of FIG. 3.
Figure 6:
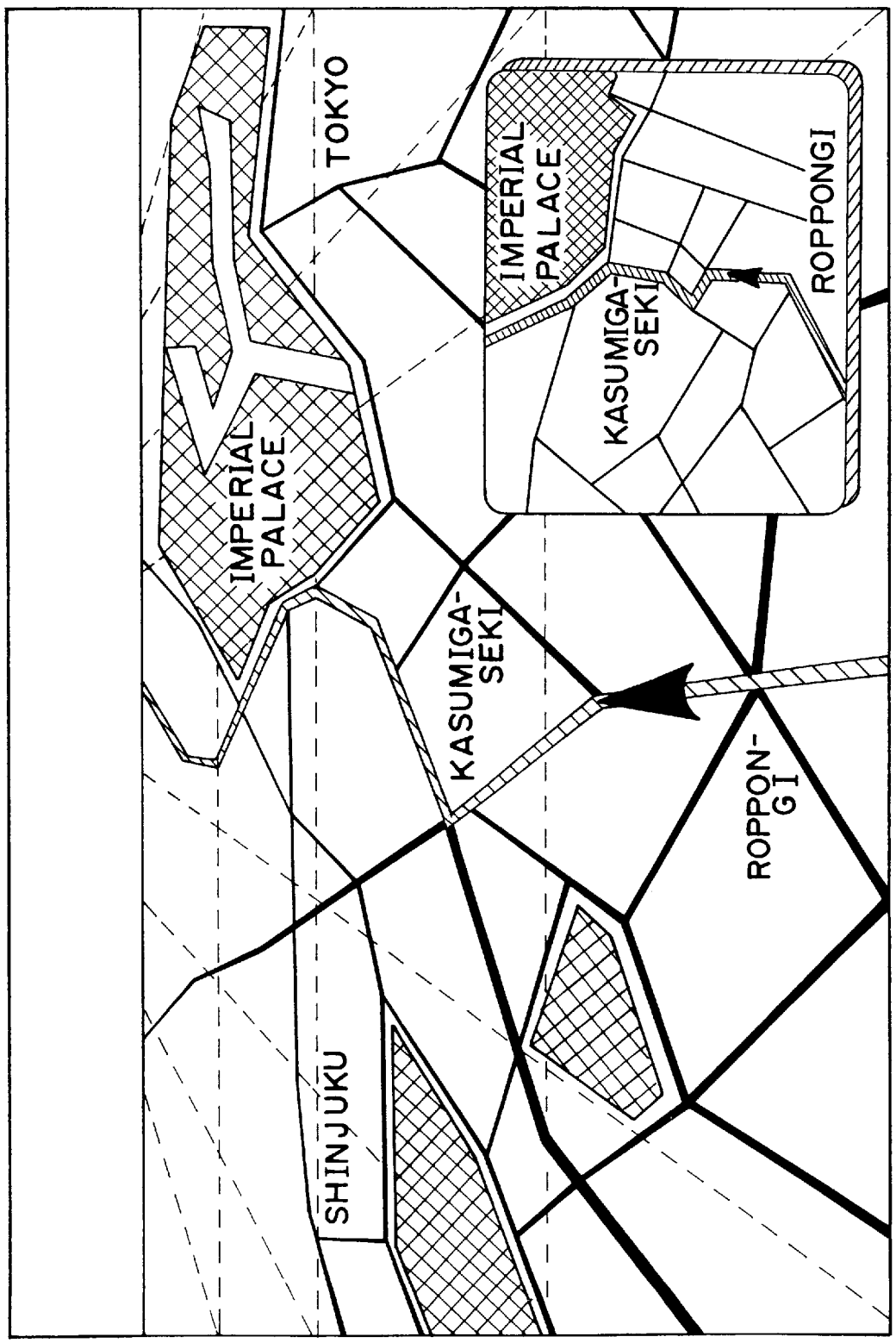
FIG. 6 is a view showing an example in which a bird's-eye view is displayed in a base screen while a planimetric map is displayed in a window screen.

FIGS. 3 through 5 are detailed flow charts of the map display routine of step S5 of FIG. 2. In step S101 of FIG. 3, it is determined whether the road map to be displayed in the base screen is in the form of the bird's-eye view or not. This determination is made on the basis of the display screen mode established in step S2 of FIG. 2. If an affirmative decision is obtained in step S101, step S102 is then executed to effect a bird's-eye view display routine as shown in detail in FIG. 4, so that the bird's-eye view is displayed in a base screen region on the screen.

If a negative decision is obtained in step S101, on the other hand, the control flow of control circuit 3 goes to step S103 to implement a planimetric map display routine as shown in detail in FIG. 5, so that the planimetric map is displayed in the base screen region on the screen.

Upon completion of the routine of step S102 or S103, step S104 is then executed to determine whether the window screen is displayed or not. This determination is also made on the basis of the display screen mode established in step S3 of FIG. 2.

If an affirmative decision is obtained in step S104, the control flow goes to step S105 to determine the road map to be displayed on the window screen is in the form of the bird's-eye view or not. This determination is also made on the basis of the display screen mode established in step S2 of FIG. 2. If an affirmative decision is obtained in step S105, step S106 is then executed to implement the bird's-eye view display routine as shown in detail in FIG. 4 so as to display the bird's-eye view in the window screen. If a negative decision is obtained in step S105, on the other hand, step S107 is then executed to implement the planimetric view display routine as shown in detail in FIG. 5 so as to display the planimetric view in the window screen.

When the routine of step S106 or S107 is terminated, or when a negative decision is obtained in step S104, the control flow goes to step S108 to display the appended information, such as the vehicle position mark, in both of the base screen and the window screen, and then returns to the main routine.

FIG. 4 is a detailed flow chart of the bird's-eye view display routine of step S102 or step S106 of FIG. 3. In step S201 of FIG. 4, a display direction angle used for display of the bird's-eye view is calculated.

Figure 7:
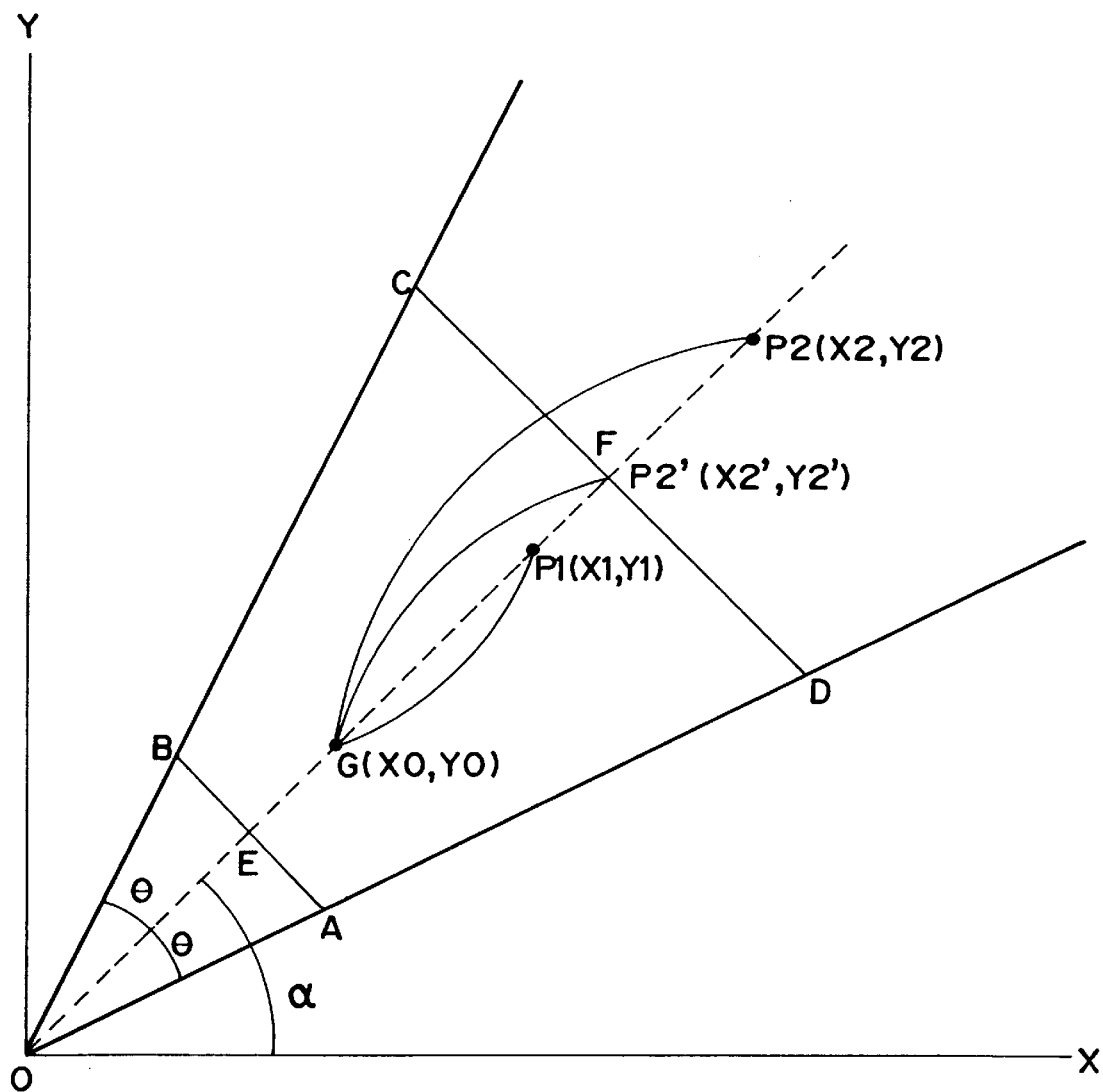
FIG. 7 is a view explaining a manner of calculating a display direction angle α.

FIG. 7 is a view explaining a method for calculating the display direction angle $\alpha$. The XY axes shown in the figure define a road map plane in which the origin O represents the departure point of the vehicle, and the coordinates G (X0, Y0) represent the current position of the vehicle, while the coordinates P1 (X1, Y1) represent the destination.

As shown in the figure, the display direction angle $\alpha$ is an angle formed by a segment (indicated by a dotted line in the figure) connecting the current position G and the destination P1, and the X axis, and is represented by the equation (1).

$$\tan\alpha = \{(Y1-Y0)/(X1-X0)\} \quad (1)$$

In the above-described step S201, the display direction angle $\alpha$ is obtained according to the equation (1).

In step S202, the road map data around the current position is retrieved from the map storage memory 2 on the basis of the current position detected in step S4 of FIG. 2, and the display direction angle $\alpha$ calculated in step S201. For example, the road map data is retrieved with respect to an area within a several tens of kilometers square including the current position.

In step S203, data used for displaying the bird's-eye view are selected from the road map data retrieved in step S202, and the selected data are stored in the bird's-eye view data memory 6. To reduce the amount of data of road map information to be displayed on the display device 8, only data of such kinds that satisfy predetermined requirements are selected and stored in the bird's-eye view data memory 6. In step S204, the road map data selected in step S203 are converted into bird's-eye view data.

Figure 8:
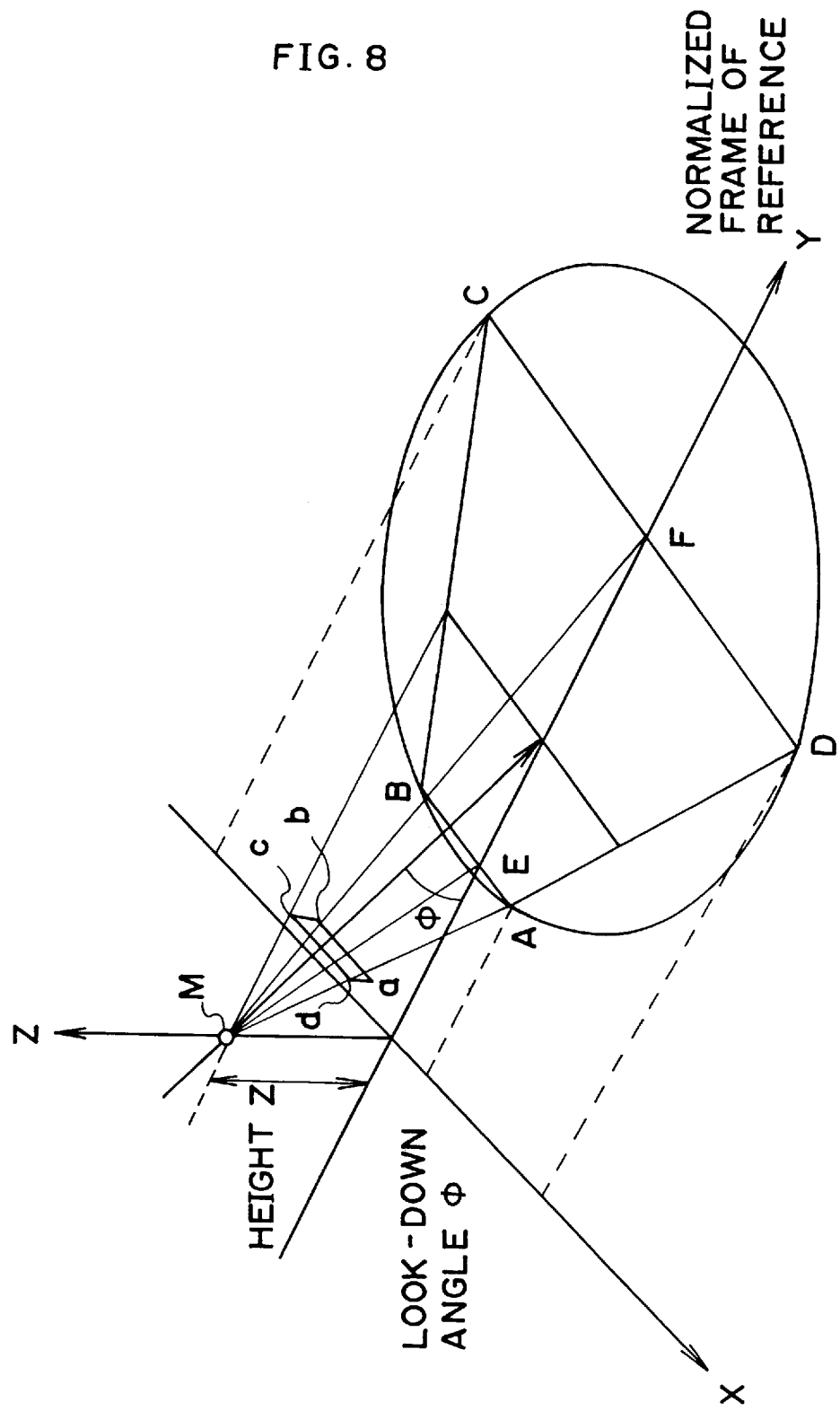
FIG. 8 is a view explaining data conversion into bird's-eye view data.
Figure 9:
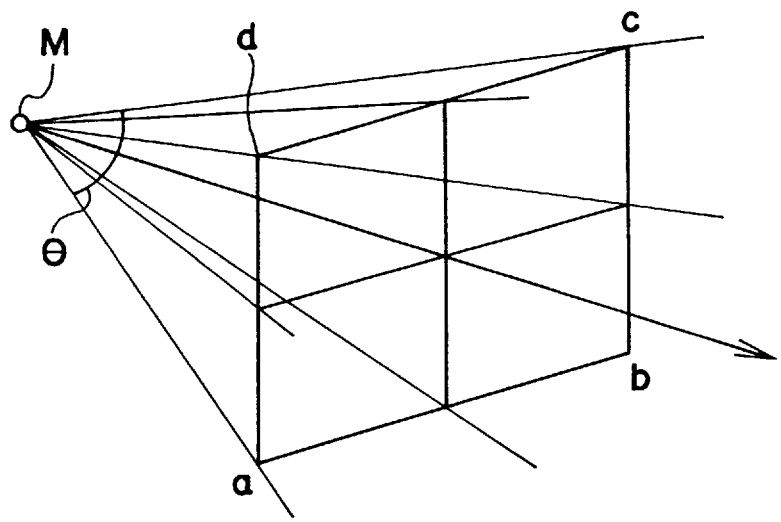
FIG. 9 is an enlarged view showing a rectangle "abcd" of FIG. 8.

FIG. 8 is a view for explaining the conversion into the bird's-eye view data, in which an example is shown wherein a road map extends in the XY plane, and a view point M is placed on the Z axis that meets at right angles with the XY plane, so as to look down the map at an angle of $\Phi$. The rectangle "abcd" of FIG. 8, which is shown in enlargement in FIG. 9, indicates the size of the display screen of the display device 8, and the trapezoid "ABCD" of FIG. 8 indicates a range of the road map to be displayed on the display device 8.

To convert the road map data into the bird's-eye view data, the height Z of the view point M, the looking-down angle $\Phi$ by which the road map is looked down from the view point M, and the looking-around angle $\theta$ from the view point are determined so that all of the road map data within the trapezoidal region "ABCD" shown in the figure are displayed on the display device 8. Thereafter, the bird's-eye view data to be projected in the rectangular region "abcd" of FIG. 8 are prepared using these parameters. In this conversion processing, the looking-down angle $\Phi$ is determined so that the destination lies in a direction approximate to a center line connecting respective middle points of the upper and lower edges of the display screen of the display device 8.

Referring back to FIG. 4, step S205 is executed to convert the bird's-eye view data obtained in step S204 into map image data for displaying final images on the display device 8, and returns to map display routine.

FIG. 5 is a detailed flow chart of the planimetric map display routine of step S103 or S107 of FIG. 3. In step S301 of FIG. 5, the road map around the current position of the vehicle is retrieved from the map storage memory 2. In step S302, data used for planimetric map indication are selected from the road map data retrieved in step S301, and the selected data are stored as planimetric map data in the planimetric map data memory 5. In this step, data sorted in a relatively high rank of priority are selected in the same manner as in step S203 of FIG. 4. In step S303, the planimetric map data stored in the planimetric map data memory 5 are converted into map image data, which is then stored in the image memory 7, and the control flow returns to the map display routine.

The routines of FIGS. 2 through 5 as explained above will be described in short. Initially, the control circuit 3 determines the destination of the vehicle and the recommended route, and then establishes the screen display mode and the display environments. In the case where the mode for displaying the bird's-eye view in the base screen and the planimetric map in the window screen is selected, for example, the bird's-eye view is first displayed in the base screen, and the planimetric map is then displayed in the window screen. The map scale, display area and display position of the window screen are established by the operator through the input device 4. When the vehicle runs a predetermined distance or farther, the whole images in the base screen and window screen are updated or rewritten. When the vehicle runs less than the predetermined distance, only the vehicle position marks in the base screen and the window screen are shifted to appropriate positions.

Thus, in the first embodiment, the road map can be displayed in different map forms on the base screen and the window screen. For example, the bird's-eye view can be displayed in the base screen, and the planimetric map can be displayed in the window screen. In this case, the planimetric map display in the window screen can make up for a shortcoming of the bird's-eye view indication, namely, a difficulty in grasping a sense of distance.

Further, in the above-described first embodiment, the map storage memory 2 as a common map data base is used for displaying either of the bird's-eye view and the planimetric map on the display device 8. Thus, there is no need to provide a map storage memory exclusively used for preparing the bird's-eye view data, and another map storage memory exclusively used for preparing the planimetric map data. This leads to reduced cost and reduced size of the apparatus.

Moreover, the road map data used for display on the display device 8 are stored in advance in the bird's-eye view data memory 6 and the planimetric map data memory 4. Therefore, the display may be rapidly switched from the bird's-eye view to the planimetric map and vice versa.

Second Embodiment

In the second embodiment, the window screen is not normally provided, but displayed only when the vehicle approaches a certain guidance point.

The second embodiment has a structure in common with that of the first embodiment, and operates in the same manner as the first embodiment except the processing of step S104 of FIG. 3. In the following, the processing of step S104 of FIG. 3 will be mainly explained.

Figure 10:
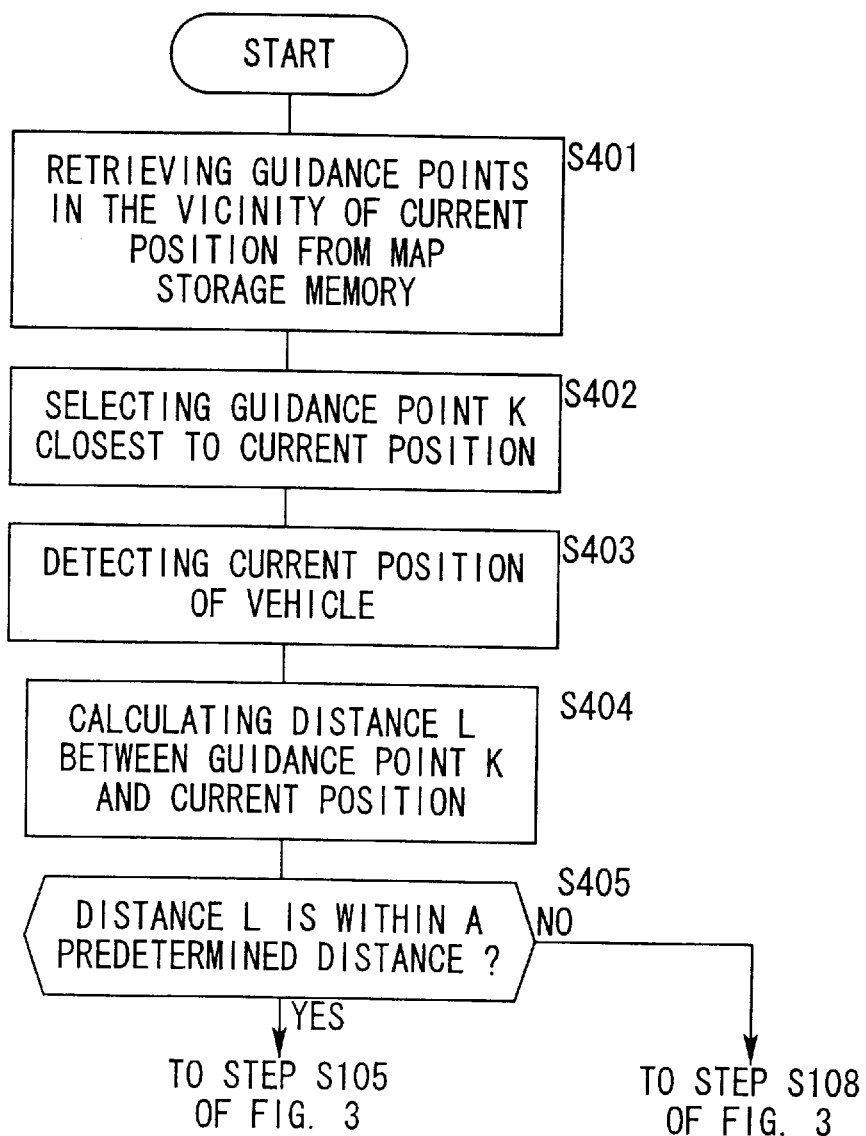
FIG. 10 is a detailed flow chart of step S104 of FIG. 3 used in the second embodiment.

FIG. 10 is a detailed flow chart of step S104 of FIG. 3 that is employed in the second embodiment. In step S401 of FIG. 10, guidance points located in the vicinity of the current position of the vehicle are retrieved from the map storage memory 2. The guidance point mentioned herein means a point on a recommended route, which is needed for guiding the operator along the recommended route, and consists of an intersection or a point of a curve, for example. The information related to the guidance points on the recommended route is stored in advance in the map storage memory 2.

Figure 11:
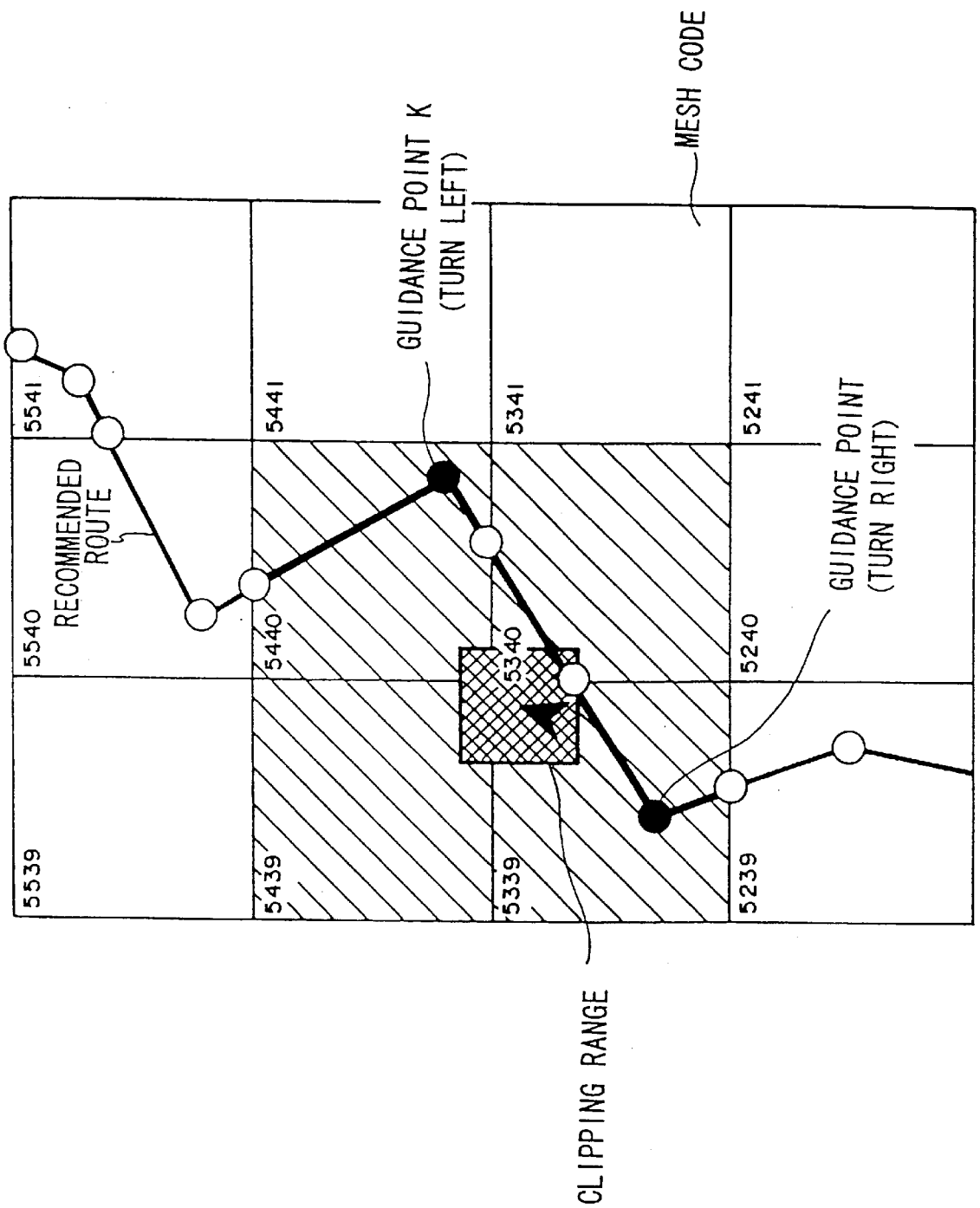
FIG. 11 is a view explaining details of the processing of step S401 of FIG. 10.

FIG. 11 is a view explaining in detail the processing of step S401 of FIG. 10. A plurality of square regions as shown in FIG. 11 are retrieval units (these units will be hereinafter called mesh codes) of the road map data, and a specific number is assigned to each of these mesh codes. A solid line in the figure indicates the recommended route, and black dots on the recommended route indicate the guidance points. Further, a triangular mark in the figure indicates the current position of the vehicle.

When the vehicle is located in a region having the mesh code 5339 as shown in FIG. 11, the guidance point information with respect to each of hatched regions in the figure with four mesh codes 5339, 5340, 5439 and 5440 surrounding the above region is retrieved from the map storage memory 2.

FIG. 12 is a view showing the data structure of the guidance point information stored in the map storage memory 2. As shown in this figure, the guidance point information is divided into several regions including: a "mesh number" region storing a mesh code number, a "guidance point number" region storing the number n of the guidance point(s) within the mesh region, an "X-coordinate" region storing the X-coordinate on the map of the guidance point 1 in the mesh region, a "Y-coordinate" region storing the Y-coordinate on the map of the guidance point 1 in the mesh region, a "guidance point designation flag" region for determining whether the guidance point 1 is to be selected as a guidance point or not, and other regions.

Referring back to FIG. 10, step S402 is executed to select a guidance point which is closest to the current position of the vehicle, from the guidance points retrieved in step S401. In the case of FIG. 11, the guidance point K is selected. In step S403, the current position of the vehicle is detected again. In step S404, the distance L between the guidance point K and the current position of the vehicle is calculated. In step S405, it is determined whether the distance L is equal to or less than a predetermined distance. If an affirmative decision is obtained in this step, the control flow goes to step S105 of FIG. 3 to effect the processing for displaying the window screen. If a negative decision is obtained in step S405, on the other hand, the control flow goes to step S108 of FIG. 3 to merely update or rewrite the appended information, such as the vehicle position mark, in the window screen.

As explained above, the apparatus of the second embodiment carries out route guidance without displaying the window screen until the vehicle approaches the relevant guidance point. Once the vehicle approaches the guidance point, the window screen is automatically displayed, thus informing the driver of closeness of the guidance point by displaying the window screen. Accordingly, the driver is prevented from passing the guidance point without noticing that the vehicle has approached the guidance point. Further, the vicinity of the guidance point can be displayed in detail in the window screen, thereby enabling the driver to correctly grasp the travelling direction of the vehicle.

Third Embodiment

In the third embodiment, the display screen of the display device is divided into two screen regions, and a bird's-eye view is displayed in one of the screen regions while a planimetric map is displayed in the other screen region. The third embodiment is different from the first embodiment only in respect of the map display routine to be implemented by the control circuit 3. In the following description, therefore, the map display routine will be mainly explained.

Figure 13:
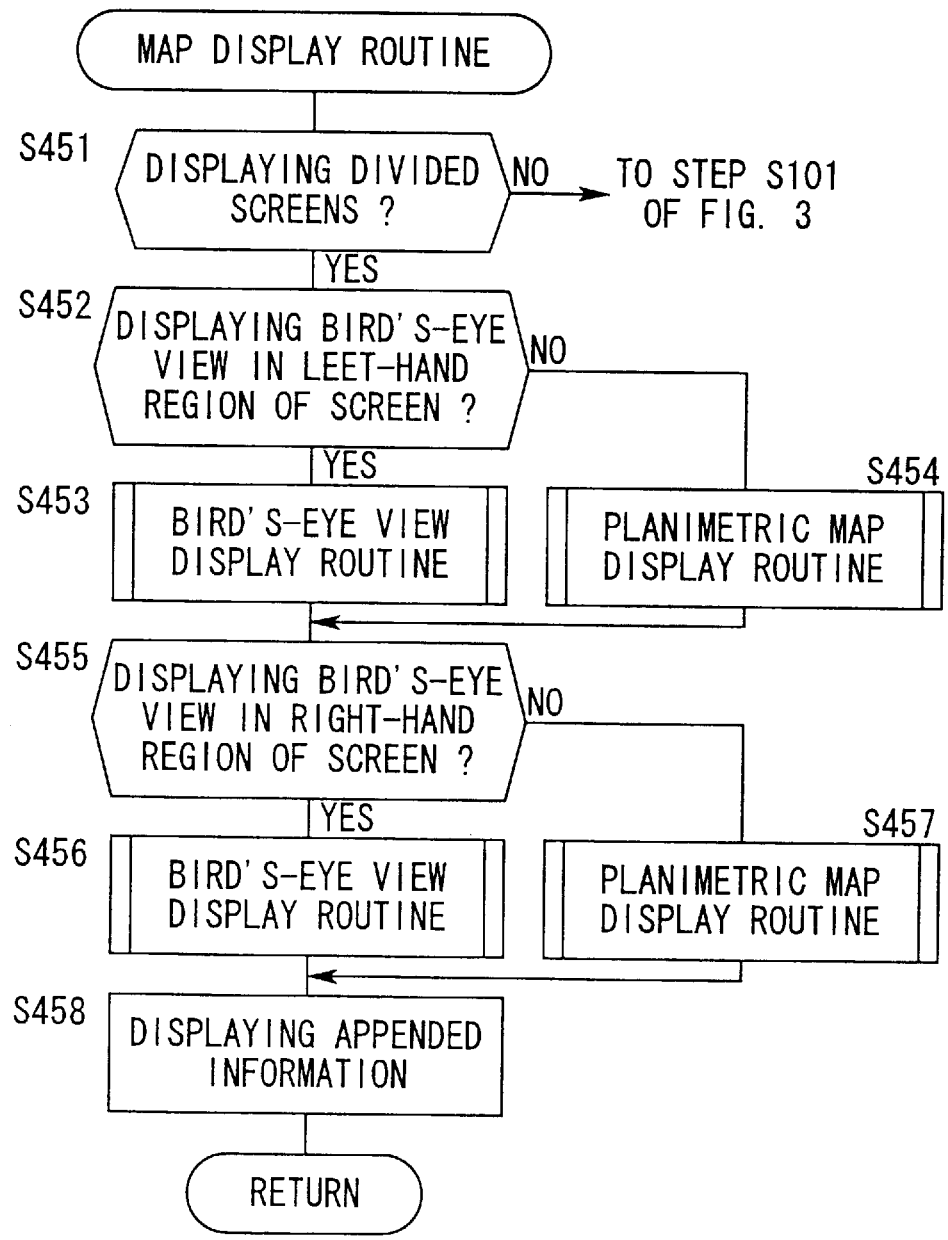
FIG. 13 is a flow chart showing a map display routine of the third embodiment.

FIG. 13 is a flow chart showing the map display routine of the third embodiment. In step S451 of FIG. 13, it is determined whether divided screens are to be displayed or not. In this step, the determination is made on the basis of the display screen mode selected by the operator by means of the input device 4. A mode for displaying the divided screens is included.

In step S452, it is determined whether the bird's-eye view is displayed in the left-hand screen region of the display screen. In this step, the determination is made on the basis of the display environments established by the operator by means of the input device 4. If an affirmative decision is obtained in step S452, the control flow goes to step S453 to implement the bird's-eye view display routine as shown in detail in FIG. 4. If a negative decision is obtained in step S452, on the other hand, the control flow goes to step S454 to implement the planimetric map display routine as shown in detail in FIG. 5.

Upon completion of the routine of step S453 or S454, step S455 is then executed to determine whether the bird's-eye view is displayed in the right-hand screen region of the display screen. If an affirmative decision is obtained in step S455, the control flow goes to step S456 to implement the bird's-eye view display routine as shown in detail in FIG. 4. If a negative decision is obtained in step S455, on the other hand, the control flow goes to step S457 to implement the planimetric map display routine as shown in detail in FIG. 5. Upon completion of the routine of step S456 or S457, step S458 is then executed to effect the processing for displaying appended information, such as vehicle position marks.

Figure 14:
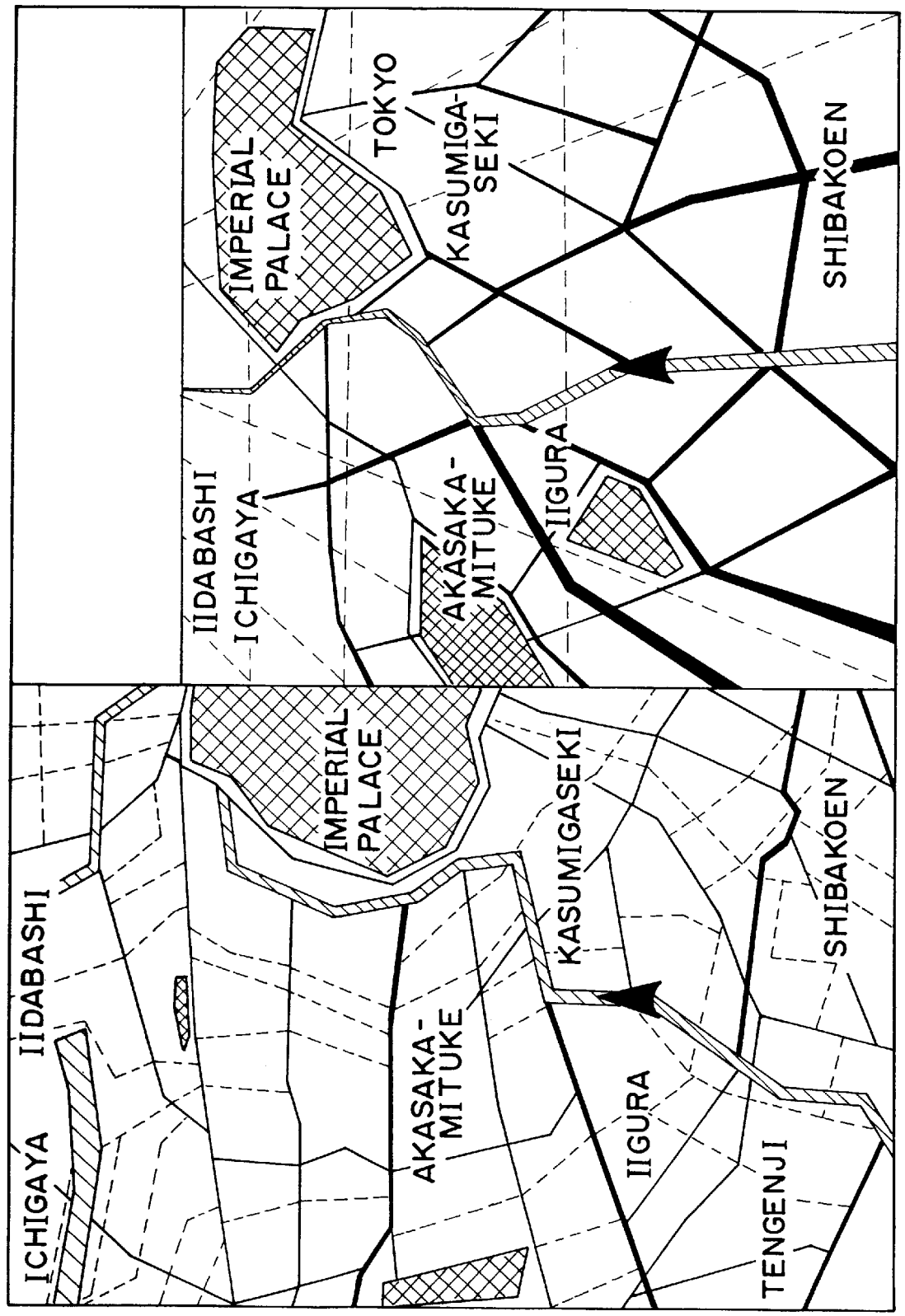
FIG. 14 is a view showing an example in which a display screen is divided into two screen regions, and a bird's-eye view and a planimetric map are concurrently displayed in these screen regions.

As a result of the above-described routine, the bird's-eye view and planimetric map may be displayed in different screen regions at the same time, as shown in FIG. 14. In the example of FIG. 14, the bird's-eye view is displayed in the right-hand screen region, and the planimetric map is displayed in the left-hand screen region. In this example, a part (in the vicinity of the vehicle position) of a range of the road map displayed in the form of the bird's-eye view is displayed in the form of the planimetric map. Therefore, a wide range of road map extending from the vehicle position toward the destination can be confirmed with the bird's-eye view, and a detailed road map around the vehicle position can be confirmed with the planimetric map.

Fourth Embodiment

Figure 15:
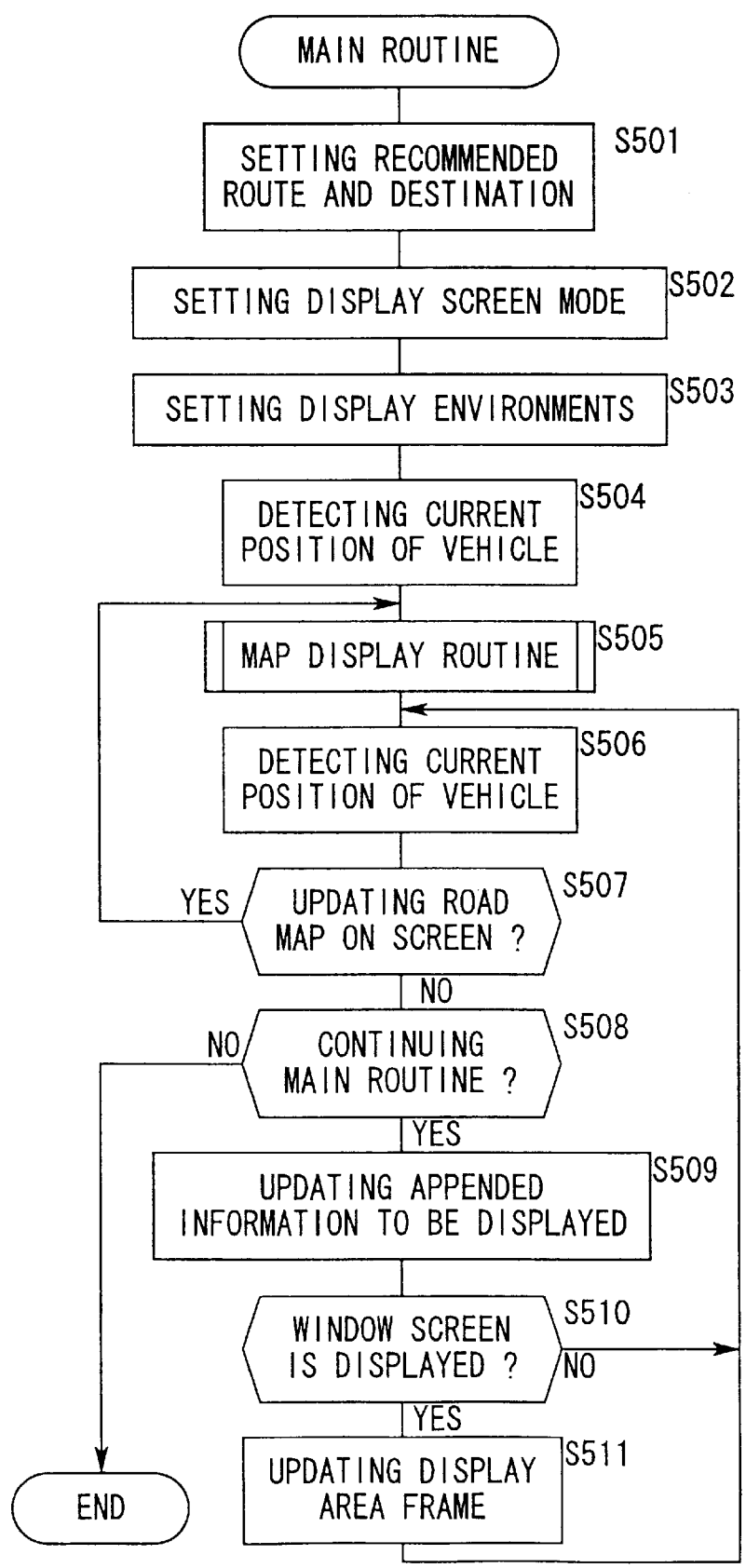
FIG. 15 is a flow chart showing a main routine implemented by a control circuit of the fourth embodiment.

In the fourth embodiment, a display area frame defining a map display range of the base screen is displayed in the window screen. FIG. 15 is a flow chart showing the main routine implemented by the control circuit 3 of the fourth embodiment. The flow chart of FIG. 15 is different from that of the first embodiment as shown in FIG. 2 only in respect of steps S510 and S511. In the following description, therefore, the processing of steps S510 and S511 will be mainly explained.

Figure 16:
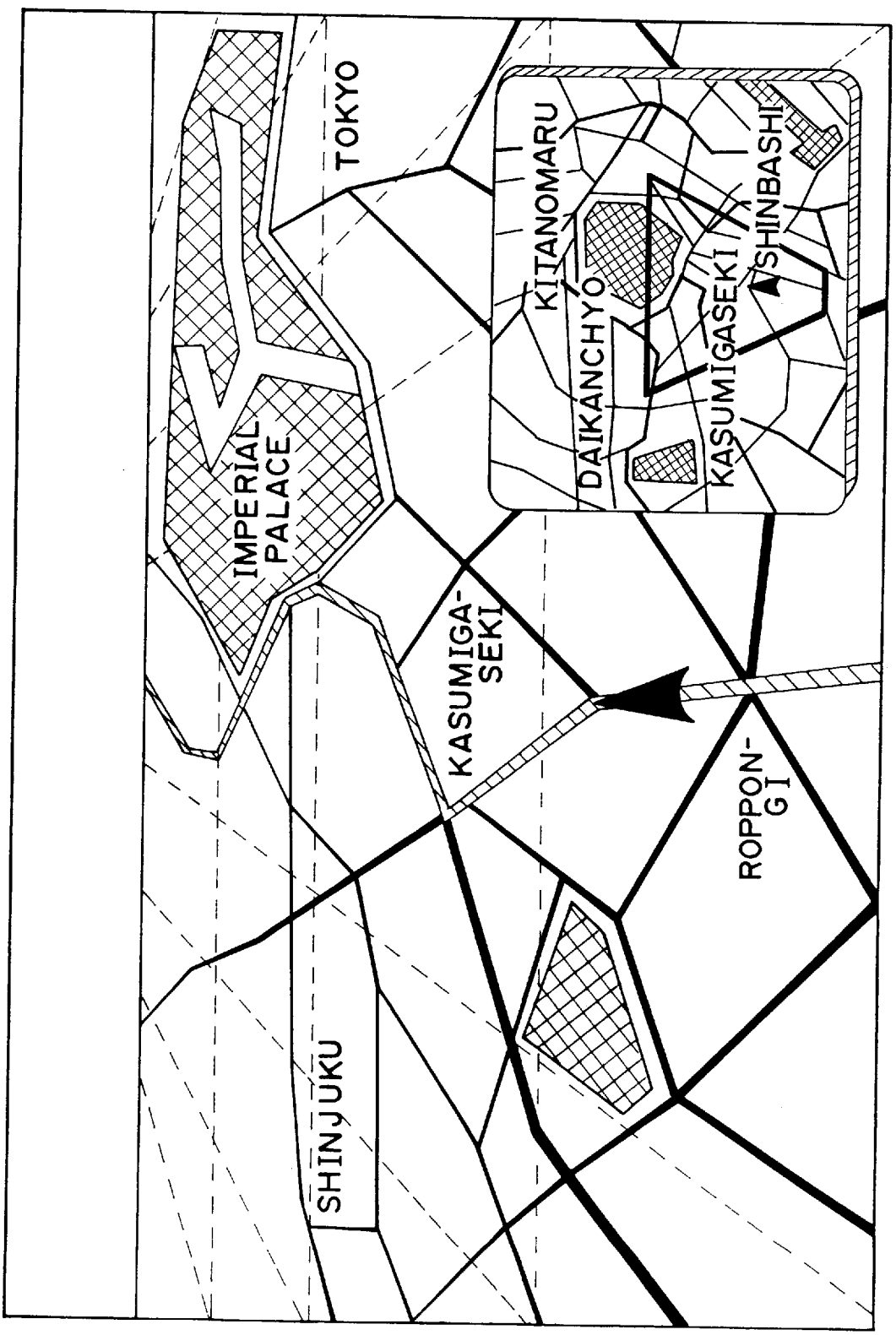
FIG. 16 is a view showing an example in which a display area frame is displayed in a window screen.

In step S510 of FIG. 15, it is determined whether the window screen is displayed in the display screen. If a negative decision is obtained in this step, the control flow returns to step S506. If an affirmative decision is obtained, the control flow goes to step S511 to update the display area frame. In step S511, the display area frame is updated. The display area frame mentioned herein means a frame defining a road map range displayed in the base screen. As shown in FIG. 16, the display area frame is displayed with a thick solid line within the window screen.

Figure 17A:
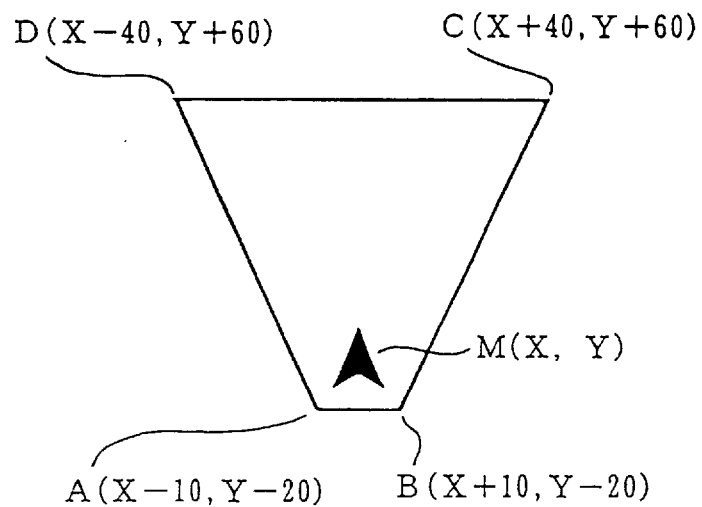
FIGS. 17A and 17B are views explaining details of a method of displaying the display area frame.

FIG. 17 is a view explaining in detail a manner of displaying the display area frame. As shown in FIG. 17, a triangular vehicle position mark M is displayed within the display area frame. In FIG. 17A, the coordinates of the vehicle position mark are represented by M (X, Y), and the coordinates of respective points A, B, C, D of the trapezoidal region "ABCD" indicating the display area frame are represented by A (X−10, Y−20), B (X+10, Y−20), C (X+40, Y+60), and D (X−40, Y+60), respectively.

Figure 17B:
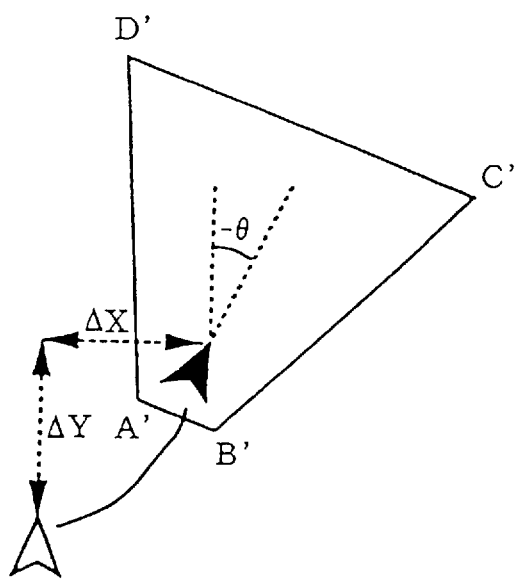

FIG. 17B shows an example wherein the vehicle has moved from the position M of FIG. 17A by a distance corresponding to (ΔX, ΔY). As shown in the figure, the display area frame is shifted from the above-indicated coordinates "ABCD" to "A'B'C'D'" so that the position of the vehicle position mark relative to the display area frame does not change.

Figure 18A:
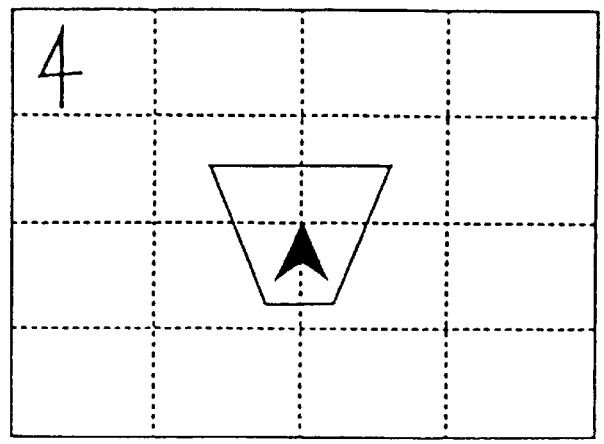
FIGS. 18A–18C are views explaining scrolling of the display area frame in the window screen.
Figure 18B:
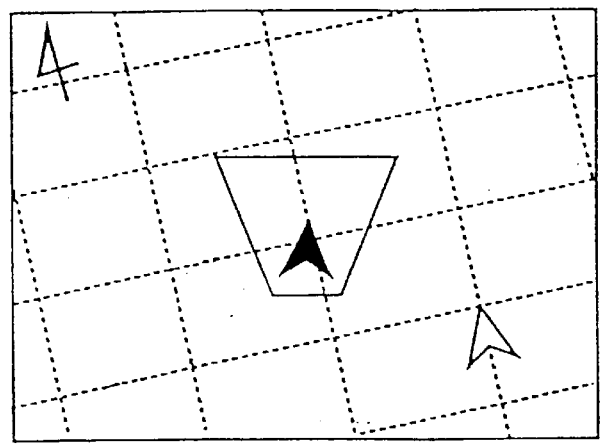
Figure 18C:
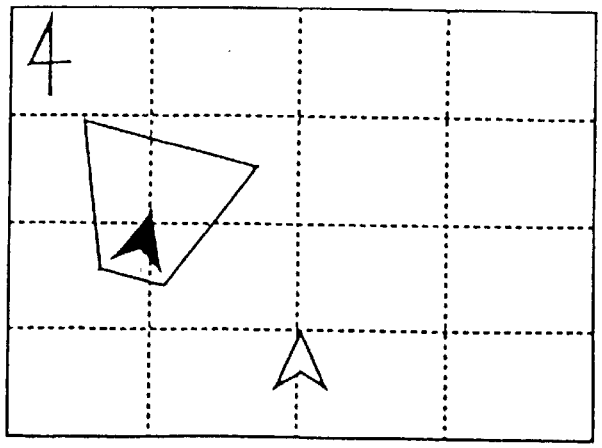

FIG. 18 is a view explaining scrolling of the display area frame within the window screen. FIG. 18A is a view showing the display area frame before movement of the vehicle, with the top of the window screen oriented in the north direction of the map, and FIG. 18B is a view showing the display area frame after movement of the vehicle, with the top of the screen oriented in the travelling direction of the vehicle. FIG. 18C is a view showing the display area frame after movement of the vehicle, with the top of the window screen oriented in the north direction. In FIGS. 18B and 18C, white triangular marks represent the position of the vehicle before it moves, and black rectangular marks represent the vehicle position after its movement.

As shown in FIGS. 18B and 18C, the vehicle position mark is displayed at a fixed position within the display area frame irrespective of which direction in which the vehicle moves, and which direction in which the frame is displayed in the window screen.

FIG. 19 is a detailed flow chart of the map display routine of step S505 of FIG. 15. The flow chart of FIG. 19 is different from the map display routine of the first embodiment as shown in FIG. 13 only in respect of step S608. In the following description, therefore, the processing of the step S608 will be mainly explained.

Figure 21:
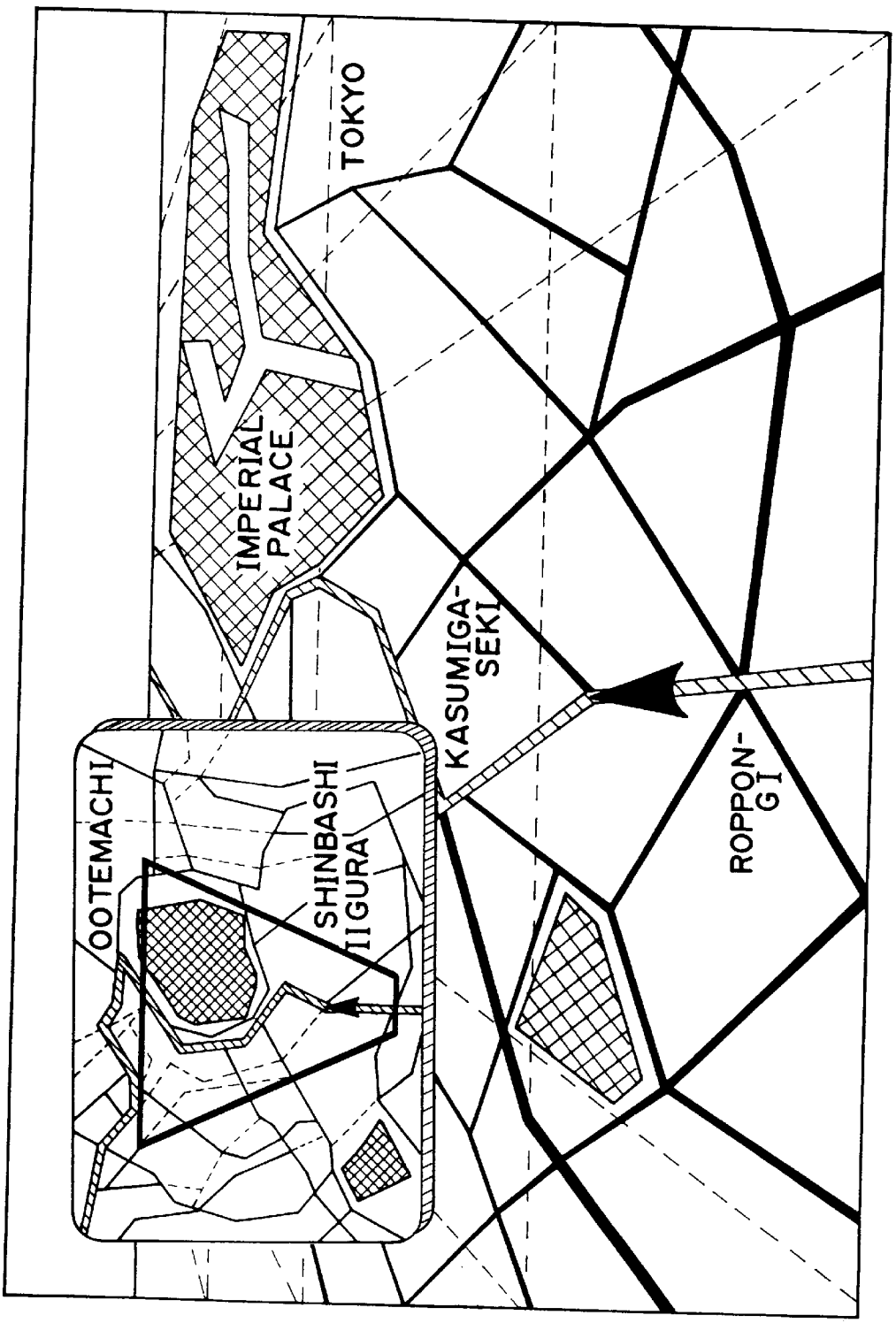
FIG. 21 is a modified example of FIG. 16 in which the display position of the window screen is changed.

In step S608 of FIG. 19, the display area frame defining the road map range to be displayed on the base screen is displayed within the window screen as shown in FIG. 16. FIGS. 20 and 21 show examples of screen display as a result of the map display routine of FIG. 19. FIG. 20 shows an example wherein a planimetric map is displayed in the base screen, and a bird's-eye view is displayed in the window screen. FIG. 21 is a modified example of FIG. 16 in which the display position of the window screen is changed. The change of the display position of the window screen is effected by implementing the above-described processing of step S3 of FIG. 2.

In the fourth embodiment as described above, the display area frame defining the road map range displayed in the base screen is displayed in the window screen, thereby allowing the operator to grasp at a glance the road map range displayed in the base screen. Even when the vehicle runs through a region that is unfamiliar to the operator or driver, therefore, the driver can easily understand the positional relationship between the current position and the destination, with a result of reduced possibility of getting lost. If the planimetric map is displayed in the window screen while the bird's-eye view is displayed in the base screen, the shortcoming of the bird's-eye view indication, namely, the difficulty in grasping a sense of distance can be overcome due to the presence of the planimetric map in the window screen.

In the examples of FIGS. 16, 20 and 21, the entire range of the road map displayed in the base screen is displayed in the window screen. Depending upon the map scale selected by the operator, however, the entire road map range displayed in the base screen may not be displayed in the window screen. In such a case, a warning to this effect may be displayed in the window screen, or only a part of the display area frame may be displayed. Otherwise, the map scale in the window screen may be automatically determined so that the entire range of the road map displayed in the base screen can be displayed in the window screen.

While the display position of the window screen may be changed in response to a command entered by the operator in the above-described fourth embodiment, the window screen may be automatically provided in an area that does not overlap the vehicle position mark or the recommended route. That is, the display position, display area and other conditions of the window screen may be automatically established.

In the illustrated embodiments, there may be provided a switch or switches for scrolling the base screen and the window screen independently of each other. When the switch for scrolling the window screen is operated, for example, the road map in the screen is scrolled in response to the operation, and the display area frame and the vehicle position mark may also be shifted at the same time.

While the display screen mode and display environments are established in the main routine of FIG. 2 executed by the control circuit 3 in the illustrated embodiments, interruption routines may be employed for establishing the display screen mode and display environments. Namely, if the operator enters a command through the input device for changing any one of the display screen mode and display environments, the processing of the control circuit 3 is interrupted so as to make a desired change in the display screen mode and others. In this manner, the mode and others can be rapidly changed as desired.

While the display area frame is displayed in the window screen in the above-described fourth embodiment, the range of the road map displayed in the base screen may be displayed with different colors, instead of the display area frame.

Availability in the Industry

As described above, the map display apparatus for a motor vehicle according to the present invention is capable of switching its display from a planimetric map to a bird's-eye view and vice versa, thus permitting the road map to be displayed with increased flexibility to meet with the convenience and preference of the driver. Since road map storage device serving as a common map data base is used for display of either of the planimetric map and bird's-eye view, there is no need to provide separate map data bases for these two forms of display, resulting in reduced cost and reduced size of the apparatus. Further, the planimetric map and the bird's-eye view can be displayed at the same time, thus eliminating a problem encountered in bird's-eye view indication, namely, a difficulty in grasping a sense of distance. Moreover, an indication defining a range of the road map displayed in the first display region in the display screen of the display device can be displayed in the second display region, thereby allowing the driver or operator to grasp at a glance the road map range displayed in the first display region, and enhance a sense of distance.

I claim:

1. A map display apparatus for a motor vehicle, comprising:
   road map storage device which stores road map data related to a road map; and
   a display device capable of displaying the road map;
   said map display apparatus for a motor vehicle, further comprising:
      vehicle position detecting device which detects a vehicle position;
      bird's-eye view data converting circuit which retrieves said road map data in a predetermined range of from said road map storage device and converts the road map data into bird's-eye view data, so as to display on said display device a bird's-eye view taken by looking down the road map from a view point at a predetermined looking-down angle in a predetermined looking-down direction, said view point being placed above the vicinity of the vehicle position on the road map;
      planimetric map data preparing circuit which prepares planimetric map data on the basis of said road map data so that a planimetric map of the vicinity of the vehicle position is displayed on said display device on a map scale that is unvaried in local parts of the planimetric map; and
      switching circuit which switches one of said planimetric map and said bird's-eye view to be displayed on said display device to the other.

2. A map display apparatus for a motor vehicle, comprising:
   a road map storage device which stores road map data of one or more map scales; and
   a display device capable of displaying a road map;
   said map display apparatus for a motor vehicle, further comprising:
      bird's-eye view data converting circuit which selects said road map data of one map scale from said road map storage device, retrieves a part of the selected road map data, and converts the retrieved road map data into bird's-eye view data, so as to display on said display device a bird's-eye view taken by obliquely looking down the road map in the vicinity of a vehicle position from above;
      planimetric map preparing circuit which selects said road map data of one map scale from said road map storage device, and prepares planimetric map data on the basis of the selected road map data, so that a planimetric map of the vicinity of the vehicle position is displayed on said display device on a map scale that is unvaried in local parts of the planimetric map; and
      display control circuit which displays at least one of said bird's-eye view and said planimetric map on said display device, on the basis of said bird's-eye view data and said planimetric map data.

3. A map display apparatus for a motor vehicle as defined in claim 2, further comprising:
   bird's-eye view conversion data storage device which selects said road map data of one map scale from said road map storage device, and stores at least a part of the selected road map data; and
   planimetric map preparation data storage device which selects said road map data of one of said at least one map scale from said road map storage device, and stores at least a part of the selected road map data; and wherein
   said bird's-eye view data converting circuit effects conversion into said bird's-eye view data on the basis of said road map data stored in said bird's-eye view conversion data storage device, and
   said planimetric map preparing circuit prepares said planimetric map data on the basis of said road map data stored in said planimetric map preparation data storage device.

4. A map display apparatus for a motor vehicle, comprising:
   road map storage device which stores road map data related to a road map; and
   a display device capable of displaying the road map;
   said map display apparatus for a motor vehicle, further comprising:
      a vehicle position detecting device which detects a vehicle position;
      bird's-eye view data converting circuit which converts said road map data of one map scale stored in said road map storage device into bird's-eye view data, so as to display on said display device a bird's-eye view taken by obliquely looking down the road map in the vicinity of the vehicle position from above;

planimetric map preparing circuit which prepares planimetric map data on the basis of said road map data of one map scale stored in said road map storage device, so that a planimetric map of the vicinity of the vehicle position is displayed on said display device on a map scale that is unvaried in local parts of the planimetric map; and display control circuit which displays said bird's-eye view in a first display region in a display screen of said display device, and displays said planimetric map in a second display region in the form of a window that is a part of said first display region.

5. A map display apparatus for a motor vehicle as defined in claim 4, further comprising a window setting circuit which sets at least one of a display size and a display position of said second display region, and a map scale of said planimetric map displayed in said second display region, and wherein said display control circuit displays said planimetric map in said second region under conditions established by said window setting circuit.

6. A map display apparatus for a motor vehicle as defined in claim 4, wherein said display control circuit displays an indication defining a range of the road map displayed in said first display region, at a position of said second display region which corresponds to said range, when a part or whole of the range of the road map displayed in the first display region is displayed in the second display region.

7. A map display apparatus for a motor vehicle as defined in claim 4, further comprising a window display instructing circuit which gives instructions for displaying the bird's-eye view in the first display region and displaying the planimetric map in the second display region, and wherein said display control circuit displays the window in said second display region only when said window display instructing circuit gives said instructions.

8. A map display apparatus for a motor vehicle as defined in claim 4, further comprising:

destination setting circuit which determines a destination of the vehicle;

recommended route setting circuit which determines a recommended route to the destination determined by said destination setting circuit;

guidance point selecting circuit which selects guidance points needed for route guiding from said road map storage device, said guidance points being located on said recommended route; and determining circuit which determines whether a distance between a vehicle position and one of the selected guidance points which is closest to the vehicle position is within a predetermined distance, and wherein said display control circuit displays the bird's-eye view in said first display region and displays the planimetric map in said second display region when said determining circuit determines that said distance is within said predetermined distance, and displays the bird's-eye view or the planimetric map in said first display region without displaying the window in said second display region when said determining circuit determines that said distance is larger than said predetermined distance.

9. A map display apparatus for a motor vehicle, comprising:

road map storage device which stores road map data related to a road map; and a display device capable of displaying the road map;

said map display apparatus for a motor vehicle, further comprising:

vehicle position detecting device which detects a vehicle position;

bird's-eye view data converting circuit which converts said road map data of one map scale stored in said road map storage device into bird's-eye view data so that a bird's-eye view taken by obliquely looking down the road map in the vicinity of the vehicle position from above is displayed on said display device;

planimetric map data preparing circuit which prepares planimetric map data on the basis of said road map data of one map scale stored in said road map storage device so that a planimetric map of the vicinity of the vehicle position is displayed on said display device on a map scale that is unvaried in local parts of the planimetric map; and display control circuit which displays said bird's-eye view in a first display region in a display screen of said display device, and displays said planimetric map corresponding to a part of a range of the road map displayed in said first display region, in a second display region that is different from said first display region.

10. A map display apparatus for a motor vehicle, comprising:

road map storage circuit which stores road map data related to a road map; and a display device capable of displaying the road map; said map display apparatus for a motor vehicle, further comprising:

vehicle position detecting device which detects a vehicle position;

bird's-eye view data converting circuit which selects said road map data of one map scale stored in said road map storage circuit, retrieves a part of the selected road map data, and converts the retrieved road map data into bird's-eye view data, so that a bird's-eye view taken by obliquely looking down the road map in the vicinity of the vehicle position from above is displayed on said display device;

planimetric map data preparing circuit which selects said road map data of one map scale stored in said road map storage device, and prepares planimetric map data on the basis of the selected road map data so that a planimetric map of the vicinity of the vehicle position is displayed on said display device on a map scale that is unvaried in local parts of the planimetric map; and display control circuit which displays said bird's-eye view or said planimetric map in a first display region within a display screen of said display device, and displays, in a second display region in the form of a window as a part of said first display region, the bird's-eye view or the planimetric map of a range that includes at least a range of the road map displayed in the first display region, while displaying an indication representing said range of the road map displayed in the first display region, in said second display region at a position thereof corresponding to said range.

11. A map display apparatus for a motor vehicle as defined in claim 10, wherein said display control circuit changes a display position of said indication in accordance with a change in a display position of a mark representing a current position of the vehicle in the display screen, so that said mark is displayed at a fixed position within said indication.

12. A map display apparatus for a motor vehicle as defined in claim 10, further comprising determining circuit which determines whether the vehicle runs not smaller than a predetermined distance, and wherein said display control circuit changes ranges of the road map displayed in said first display region and said second display region according to the vehicle position when it is determined that the vehicle has run not smaller than the predetermined distance, and changes a display position of said indication displayed in said first display region and said second display region without changing the range of the road map displayed in said first display region and said second display region if it is determined that the vehicle has run less than the predetermined distance.

* * * * *